(12) United States Patent  (10) Patent No.: US 7,503,530 B1
Brown  (45) Date of Patent: Mar. 17, 2009

(54) LIGHTING STAND

(76) Inventor: Lonnie Ray Brown, P.O. Box 816, Godfrey, IL (US) 62035

( * ) Notice: Subject to any disclaimer, the term of this patent is extended or adjusted under 35 U.S.C. 154(b) by 674 days.

(21) Appl. No.: 10/842,975

(22) Filed: May 11, 2004

(51) Int. Cl.
F16M 11/12 (2006.01)

(52) U.S. Cl. .................. 248/183.1; 248/176.1; 362/220; 362/250

(58) Field of Classification Search .................. 248/183, 248/176, 316.1, 187, 309.1; 362/250, 220
See application file for complete search history.

(56) References Cited

U.S. PATENT DOCUMENTS

| 4,232,357 | A | * | 11/1980 | Dietz | ........................ | 362/486 |
| 4,782,428 | A | * | 11/1988 | Lowell et al. | ................. | 362/11 |
| 4,803,606 | A | * | 2/1989 | Rotter | ........................ | 362/250 |
| 4,862,336 | A | * | 8/1989 | Richardson et al. | ......... | 362/285 |
| 4,866,583 | A | * | 9/1989 | Targetti | ..................... | 362/404 |
| 5,350,144 | A | * | 9/1994 | Lary | ........................ | 248/183.1 |
| 5,412,552 | A | * | 5/1995 | Fernandes | ................... | 362/250 |
| 5,743,060 | A | * | 4/1998 | Hayes et al. | ............... | 52/648.1 |

OTHER PUBLICATIONS

American DJ LTS-1 User Instructions.
American DJ LTS-2 User Instructions.
American DJ LTS-50T User Instructions.
Quik-Lok Product Catalogue, 2000.
"Quik-Lok" Product Manual pp. 76-83.

* cited by examiner

Primary Examiner—Amy J. Sterling
(74) Attorney, Agent, or Firm—Polster, Lieder, Woodruff, & Lucchesi, L.C.

(57) ABSTRACT

A stand for holding lighting comprising a single base portion, a crossbar mounting portion, and a truss. The crossbar mounting portion comprises an L-shaped bracket having a hollow cylindrical tube attached thereto. The L-shaped bracket has bores in opposite legs thereof for attaching tube clamps. The truss comprises a pair of tubes attached to one another by rods. A plurality of lighting devices are attached to the truss. The tube clamps are removably attached to the tubes of the truss to allow the truss to be removed from the crossbar mounting portion.

9 Claims, 6 Drawing Sheets

LIGHTING STAND

BACKGROUND OF THE INVENTION

The invention relates to the field of lighting stands. More specifically, the invention relates to lighting stand having an improved system for attaching a truss.

In the past, lighting stands have traditionally used methods of attaching a crossbar that are difficult to attach to the upright or base portion of the stand. Lighting stands are most often used by bands and disc jockeys to holding various styles of lighting devices that provide an atmosphere of excitement and enthusiasm, for example, disco balls, tracking lights, etc. Generally and most advantageously, these crossbars are mounted to the base portion by a single person, but frequently a second person is needed, particularly when the crossbar is to be assembled with the lights already attached.

In this regard, the present invention solves the problem of the prior art by providing a simpler method of attachment of a crossbar or truss to a base unit.

DESCRIPTION OF THE PREFERRED EMBODIMENT

Figure 1:
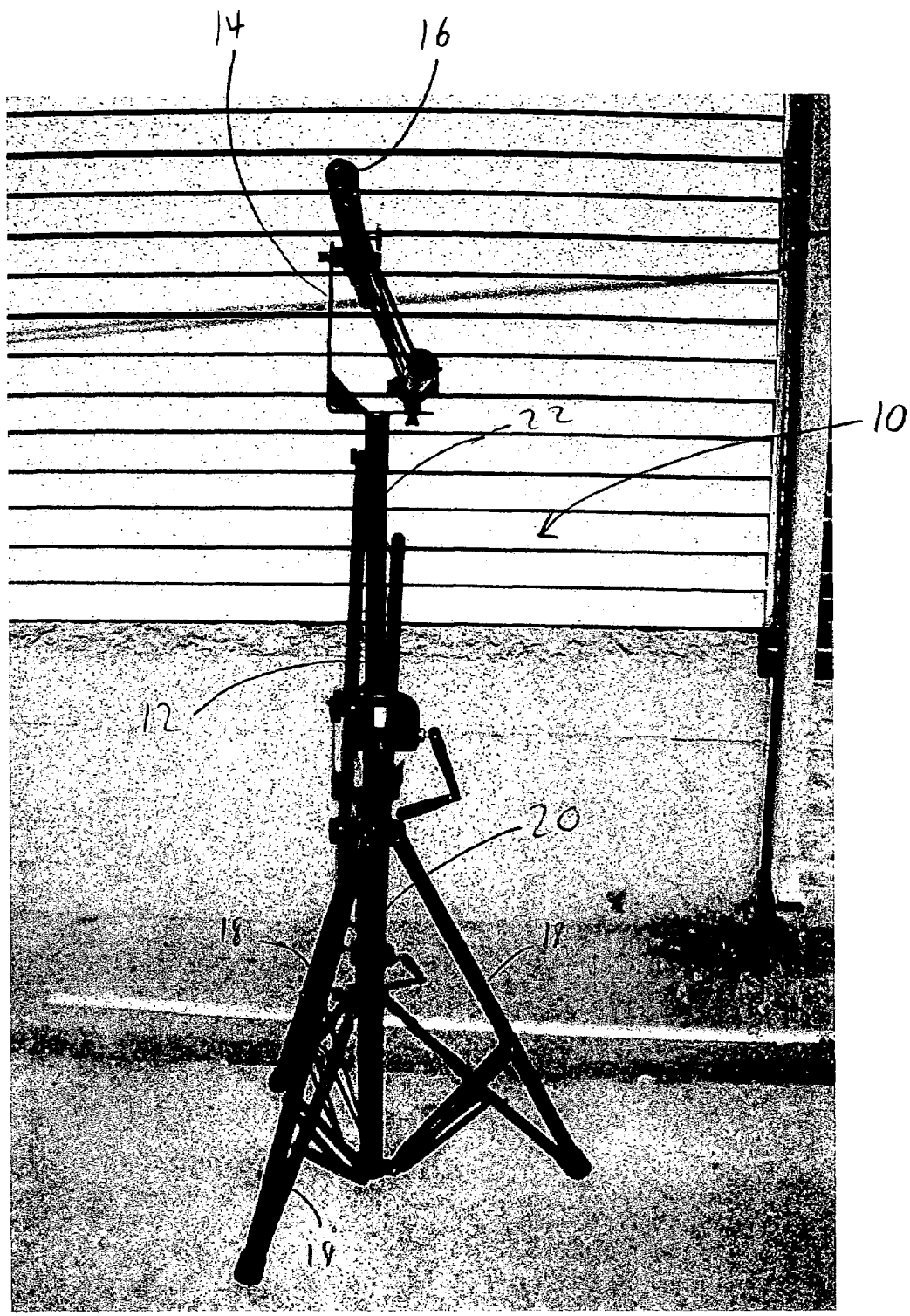
FIG. 1 is a side view of a lighting stand according to an embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, the present invention provides a lighting stand 10 for mounting lights for a band or a disc jockey that can support a truss with only a single base portion 12. The stand 10 generally comprises the base portion 12, a crossbar mounting portion 14 and a truss 16. The base portion 12 is a standard tripod base portion comprising three legs 18 and a center post 20 and is collapsible for easy transportation. Telescoping within the center post 20 is an extension post 22 for raising and lowering the crossbar mounting portion 14 and the truss 16. The base portion 12 is known in the art and further detail will not be explained here.

Figure 2:
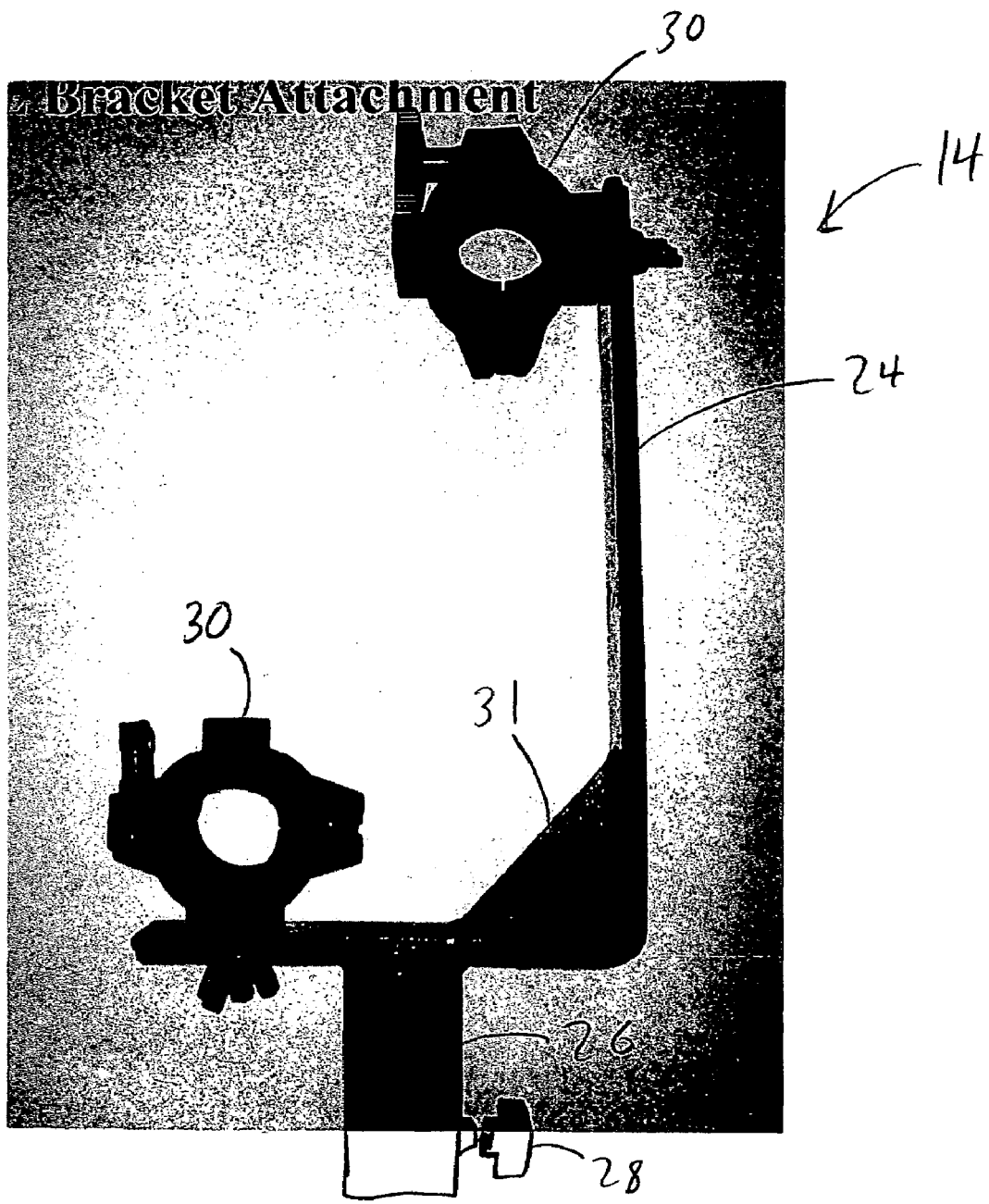
FIG. 2 is a side view of a crossbar mounting portion according to an embodiment of the present invention.

Attached to the extension post 22 is the crossbar mounting portion 14. Referring to FIG. 2, the crossbar mounting portion 14 comprises a L-shaped bracket 24 having a hollow cylindrical tube 26 attached thereto, for example by welding, and a set screw 28 threaded into the tube 26. Attached to opposite legs of the L-shaped bracket 24 are tube clamps 30. Also attached to each legs of the L-shaped bracket 24 is a stiffening bracket 31.

Figure 3:
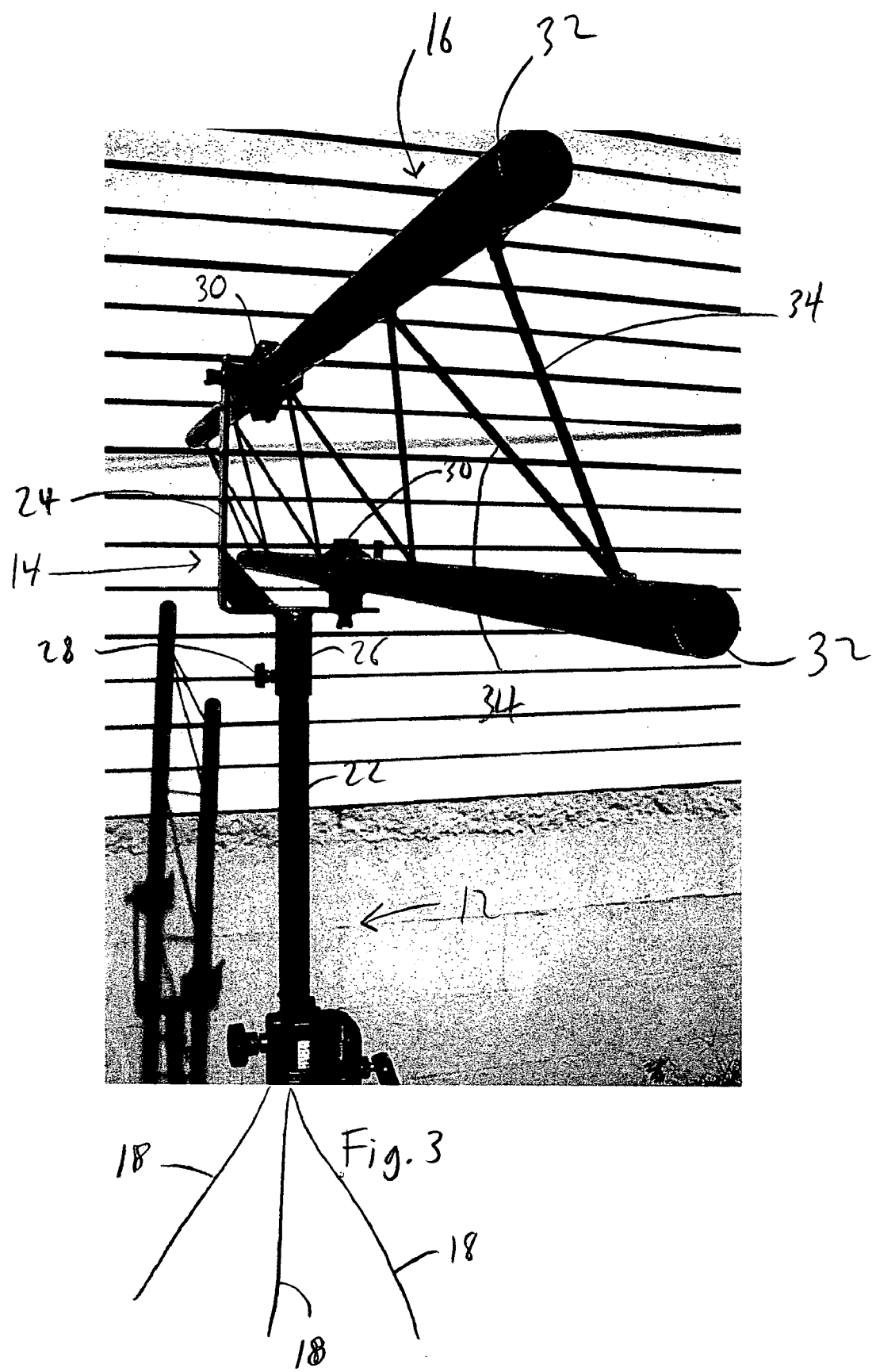
FIG. 3 is a perspective view of an attachment between the crossbar mounting portion and a truss.

Referring to FIG. 3, the truss 16 comprises a pair a tubes 32 attached to one another by a webbing of diagonally and perpendicularly arranged rods 34. The truss 16 is mounted within the tube clamps 30 of the crossbar mounting portion 14.

Figure 4:
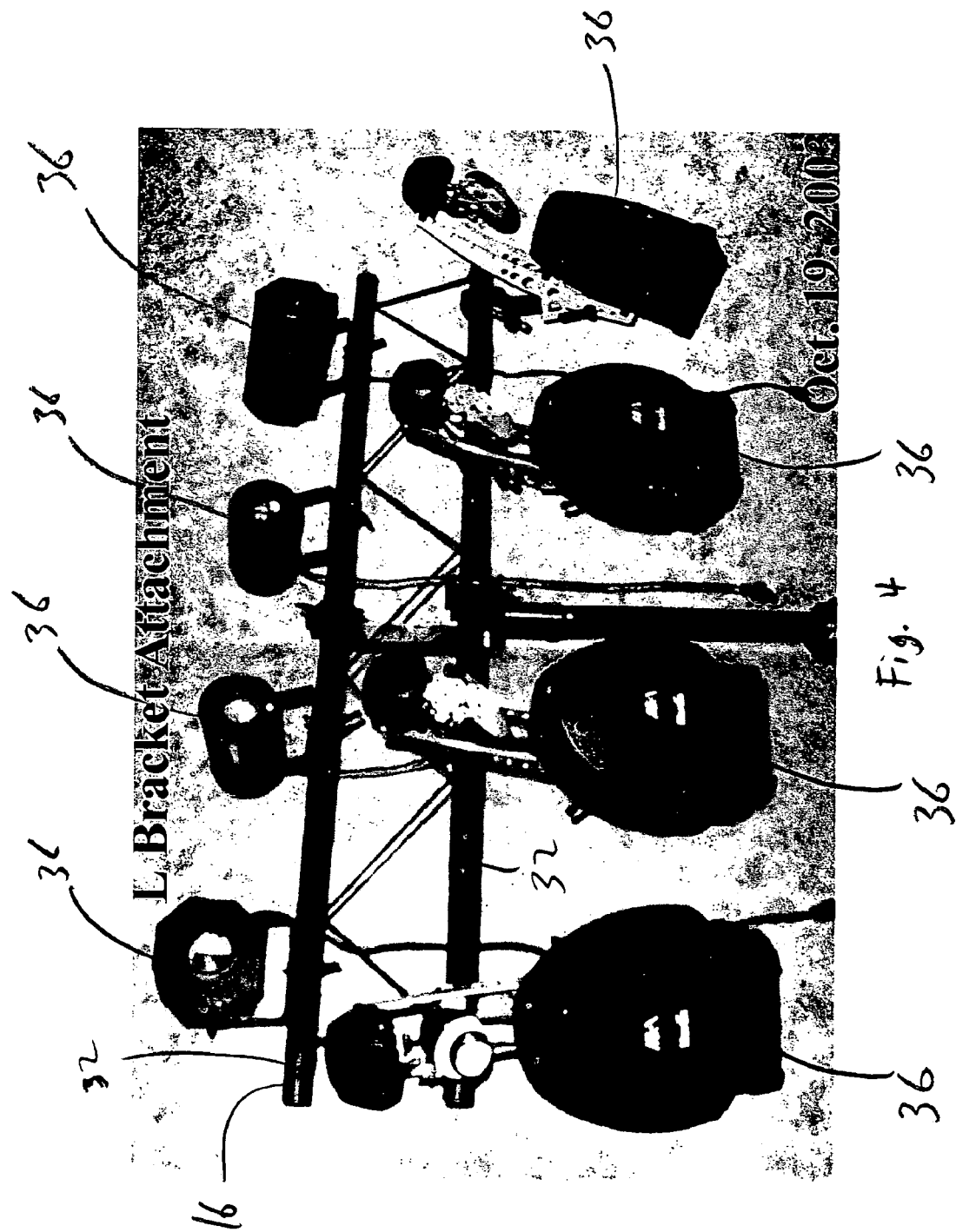
FIG. 4 is a perspective view a lighting stand according to the present invention having lighting devices attached thereto.

Referring to FIG. 4, the truss 16 is shown with lighting assemblies 36 attached to the first and second tubes 32. It can be seen from FIGS. 1-3, that the truss 16, when assembled to the truss mounting portion 14 is tilted at an angle of roughly 20 degrees.

Figure 5:
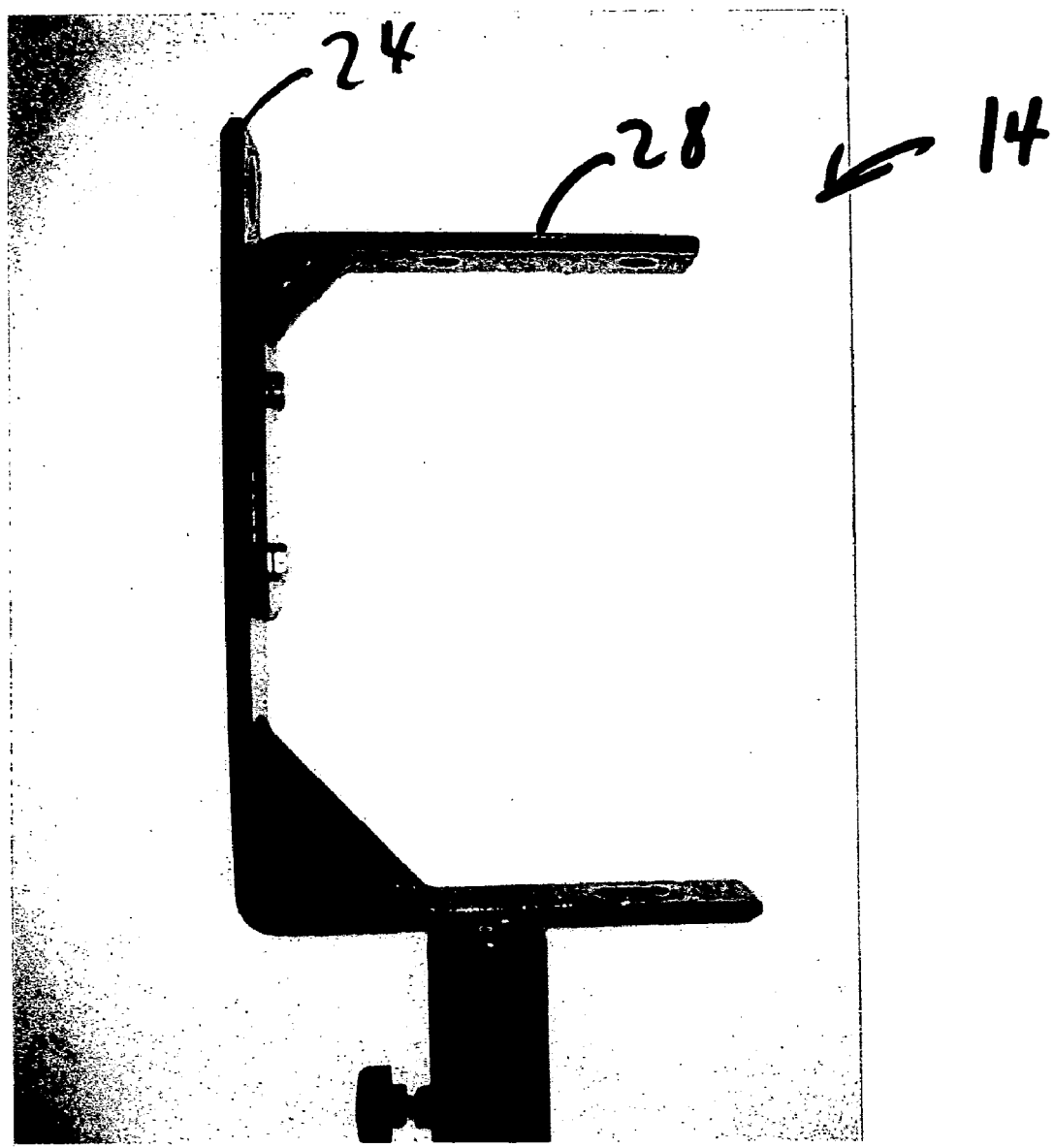
FIG. 5 is a side view of a crossbar mounting portion according to a second embodiment of the present invention.
Figure 6:
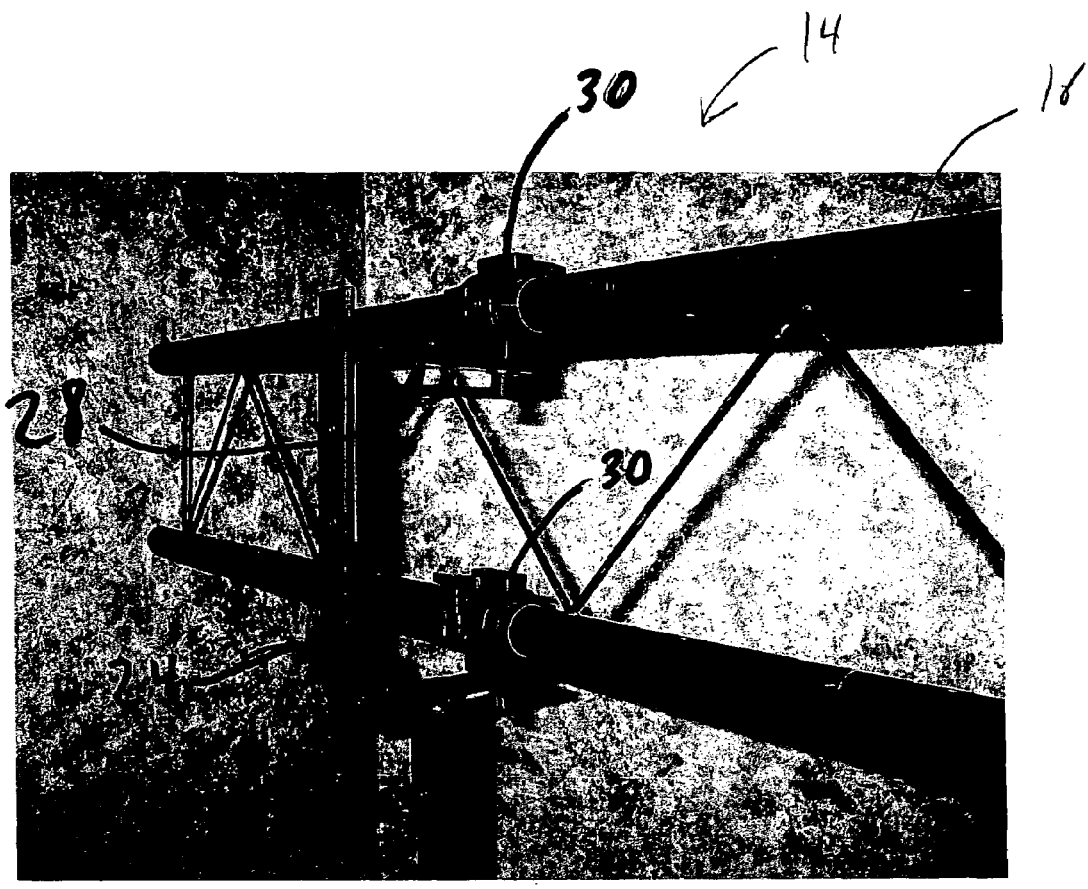
FIG. 6 is a perspective view of an attachment between the second embodiment of a crossbar mounting portion and a truss.

Turning to FIGS. 5 and 6, a second embodiment of the crossbar mounting portion 14 is shown. In the second embodiment, the truss 16 is mounted vertically rather than at an inclination. This is accomplished by add a flange 38 attached to the L-shaped bracket 24 and moving the tube clamp 30 from the vertical leg to the flange 38.

In view of the above, it will be seen that several advantages of the present invention have been achieved and other advantageous results have been obtained.

I claim:

1. A stand for holding lighting comprising:
    a single base portion;
    a crossbar mounting portion comprising an L-shaped bracket having a hollow cylindrical tube attached thereto, the L-shaped bracket having bores in opposite legs thereof for attaching tube clamps;
    a truss comprising a pair of tubes attached to one another by rods;
    a plurality of lighting devices attached to the truss;
    wherein the tube clamps are removably attached to the tubes of the truss to allow the truss to be removed from the crossbar mounting portion; and
    a stiffening bracket attached to each legs of the L-shaped bracket.

2. The stand of claim 1 wherein a set screw is threaded into the tube to fixedly attached the crossbar mounting portion to the base portion.

3. The stand of claim 1 wherein the base portion comprises three legs and a center post and wherein the legs collapse inwardly toward the center post.

4. The stand of claim 3 wherein the center post is a telescoping center post.

5. The device of claim 1 wherein the truss comprises the pair of tubes attached to one another by a webbing of diagonally and perpendicularly arranged rods.

6. The device of claim 1 wherein the truss is mounted to the crossbar mounting portion at an incline.

7. The device of claim 6 wherein the incline is roughly 290 degrees.

8. The device of claim 1 further comprising a flange attached to the crossbar mounting portion, the flange having a tube clamp mounted thereto.

9. The device of claim 8 wherein the truss mounted vertically in the crossbar mounting portion.

* * * * *